United States Patent [19]

Connell

[11] Patent Number: 5,438,116

[45] Date of Patent: Aug. 1, 1995

[54] POLYMERS AND PREPOLYMERS AND THEIR USE IN A METHOD FOR THE TREATMENT OF WOOL

[75] Inventor: David L. Connell, West Underwood, United Kingdom

[73] Assignee: Precision Processes (Textiles) Limited, Derby, United Kingdom

[21] Appl. No.: 556,976

[22] Filed: Jul. 24, 1990

[30] Foreign Application Priority Data

Jul. 24, 1989 [GB] United Kingdom ............... 8916906

[51] Int. Cl.$^6$ ............................................. C08G 59/10
[52] U.S. Cl. .................................... 528/407; 528/403; 528/405; 528/418; 528/422
[58] Field of Search ............... 528/20, 21, 129, 418, 528/422, 403, 405, 407; 564/504, 505, 511, 512

[56] References Cited

U.S. PATENT DOCUMENTS

| | | | |
|---|---|---|---|
| 3,236,895 | 2/1966 | Lee et al. | 564/525 |
| 3,347,803 | 10/1967 | Frotscher . | |
| 3,462,393 | 8/1969 | Legler et al. | 528/107 |
| 3,763,106 | 10/1973 | Markiewitz | 260/69 R |
| 3,965,072 | 6/1976 | Markiewitz | 260/77.5 |
| 3,981,913 | 9/1976 | Markiewitz | 260/553 |
| 3,996,269 | 12/1976 | Markiewitz | 528/262 |
| 4,061,624 | 12/1977 | Schultz et al. | 528/418 |
| 4,101,272 | 7/1978 | Guise et al. | 427/387 |
| 4,239,497 | 12/1980 | Kwong . | |
| 4,388,209 | 6/1983 | Rogier | 528/418 |
| 4,839,460 | 6/1989 | Molzahn . | |
| 5,126,424 | 6/1992 | Brindopke et al. | 528/45 |

FOREIGN PATENT DOCUMENTS 0260017 3/1988 European Pat. Off. .
1305136 1/1973 United Kingdom .

*Primary Examiner*—Anthony McFarlane
*Attorney, Agent, or Firm*—Wenderoth, Lind & Ponack

[57] ABSTRACT

Polymers and prepolymers derived from polyoxyalkyleneamines. The polymers and prepolymers may be used in a process for the treatment of wool so as to impart shrink resistance.

6 Claims, 2 Drawing Sheets

POLYMERS AND PREPOLYMERS AND THEIR USE IN A METHOD FOR THE TREATMENT OF WOOL

BACKGROUND OF THE INVENTION

1. Field of the Invention

This invention relates to new polymers and prepolymers derived from polyoxyalkyleneamines. The polymers and prepolymers may be used in a process for the treatment of wool so as to impart shrink resistance.

2. Description of the Prior Art

The polyoxyalkyleneamines of interest are a family of polyamines which have as their backbone repeated oxyalkylene units. Such materials have been available commercially for a number of years, for example, under the trade name of Jeffamines (Jeffamine is a registered trade mark). Belgian Patent No. 634,741 describes the preparation of polyoxyalkyleneamines by the reductive amination of polypropylene glycol ether with ammonia in the presence of Raney nickel catalyst and hydrogen. U.S. Pat. Nos. 3,236,895 and 3,462,393 teach the synthesis of polyoxy alkyleneamines by the amination of polypropylene glycol via a sulphonic acid ester. In U.S. Pat. No. 3,654,370 polyoxyalkyleneamines are produced by treating the corresponding polyol with ammonia and hydrogen over a nickel/copper/chromium catalyst.

The polyoxyalkyleneamines have found a variety of uses. They are particularly effective as epoxy curing agents and have been used in epoxy adhesives, protective or decorative coatings and reinforced composites. Other applications include use in anti-static agents, surfactants, agricultural chemicals, cosmetics, oil recovery chemicals and textile treating agents.

With regard to the latter application, that of textile treating agent, polyoxyalkyleneamines have been applied to a variety of fibres and textiles for various purposes. For example, German OS 2,645,954 describes the improvement of crease, abrasion and pilling resistance of wool textiles by the use of linking agent amines (such as Jeffamine D-400) during the shrinkproofing of such textiles. However, the polyoxyalkyleneamine is used as a catalyst for the crosslinking of epoxy groups, following the application of resins from perchloroethylene, and its association with shrinkproofing treatment itself is merely incidental. British Patent No. 942,875 refers to the formation of water-soluble anti-static coatings for fibres by reacting polyoxy alkylenediamines with aldehydes. U.S. Pat. No. 3,17 5,987 discloses the reaction of polyethylene glycoldiamine with an epoxide for the purpose of treating nylon cloth so as to resist soiling. German OS 2,058,317 refers to the reaction of a triethylene glycoldiamine with urea to form a permanent press fabric treatment.

Japanese Patent No. 71/33,152 describes the treatment of a nylon textile with an E-caprolactam-polyethylene glycol diamine-adipic acid copolymer to give improved washfast stain resistance, while Japanese Patent No. 71/37,675 relates to the melt-blending of a polyester fibre with a hexamethylenediammonium terephthalate-E-caprolactamdiamino-polyethylene glycol-adipic acid copolymer for the purpose of improving dyeability. U.S. Pat. No. 3,738,864 discloses that the treatment of fibres with the reaction product of a polyoxypropylenediamine (jeffamine D-1000) and a polyepoxide results in material with durable anti-static properties. U.S. Pat. No. 4,255,311 describes a composition useful for treatment of textiles so as to prevent creasing and which was prepared from a water-soluble epoxide resin, an acrylic copolymer and a polyoxyalkylene polyamine. U.S. Pat. No. 3,676,287 teaches that adhesion in glass fibre-reinforced elastomers can be improved by coating the fibres with a mixture which includes a lubricant prepared by condensing Jeffamine D-2000 with oleic acid.

Japanese Patent No. 84/89325 describes high rigidity resin compositions formed from a mixture of poly(phenyleneterephthalamide)-epichlorohydrin reaction product, Jeffamine D-230 and Jeffamine AC-398. U.S. Pat. No. 4,382,852 relates to demulsifiers for breaking bituminous oil-in-water emulsions and which are prepared by the condensation of certain polyoxyalkylenediamines (i.e. Jeffamines ED-2001, ED-600, ED-900, M-1000, D-230 and M-360) with epichlorohydrin. J. Med. Chem., 26(1), 7–11 refers to the preparation of compounds by the reaction of aryl glycidyl ethers with various Jeffamines and the evaluation of their affinity for $\beta$-adrenergic receptors of rat heart and lung. U.S. Pat. No. 4,323,709 discloses the reaction of epichlorohydrin with Jeffamine M-600 to give polymers useful as hydrocarbon oil additives. U.S. Pat. No. 4,239,497 describes fuel oil stabilising agents which inhibit sedimentation and discolouration during storage and are manufactured by the reaction of epichlorohydrin with amine-terminated polyoxypropylenes such as Jeffamine M-600. There is no suggestion in the prior art that any of these products could be used as shrink-resist polymers in processes for imparting a degree of shrink resistance to wool.

Many ways of rendering wool shrink resistant are known. Typically, these involve subjecting the wool to an oxidative treatment, either alone or followed by a polymer treatment. The latter type of two-step treatment has become very popular and is now the major process used throughout the world.

Various two-step shrink-proofing processes in which wool is treated first with an oxidative chlorinating agent and subsequently with a pre-formed synthetic polymer have been developed. A wide variety of polymers can be used in aqueous solution or dispersion, including polyamide-epichlorohydrin resins and polyacrylates. A review of work in this field by J. Lewis appears in Wool Science Review, May 1978, pages 23–42. British Patent Nos. 1,074,731 and 1,340,859 and U.S. Pat. Nos. 2,926,154 and 2,961,347 describe two-step shrink-proofing processes and resins or polymers suitable for use therein. These polymers are typically reactive polyamides. The polyamides can be derived from a polyalkylene polyamine and a dicarboxylic acid, e.g. diethylenetriamine and adipic acid, and are prepared by reaction with epichlorohydrin.

These conventional two-step processes confer good levels of shrink resistance but, despite achieving considerable commercial success, they do have significant disadvantages. It will be appreciated that the polymer is added to the oxidised wool to supplement the shrink resistance imparted by the oxidative pretreat, which may in some cases thus not be as severe as would be needed if this were the only treatment used to achieve the shrink resistance. The application of polymers, however, usually results in wool which has an undesirably harsh handle. To overcome this problem a softening agent is customarily employed during subsequent processing of the wool. Further, if the wool which has been treated with polymer is then dyed, the resulting rub fastness is generally inferior. This is particularly evident with certain dyestuffs commonly used in the wool industry. In general, it is found that the softening agents which are used to improve the handle of the wool will either exacerbate the poor rub fastness or are removed during the dyeing operation.

BRIEF SUMMARY OF THE INVENTION

The present invention provides new polymers and prepolymers which can be used in a method for the shrinkproofing of wool. This method not only confers a good level of shrink resistance, but also gives improved dyeing properties and a soft handle even without the use of additional softening agents.

DETAILED DESCRIPTION

Figure 1:
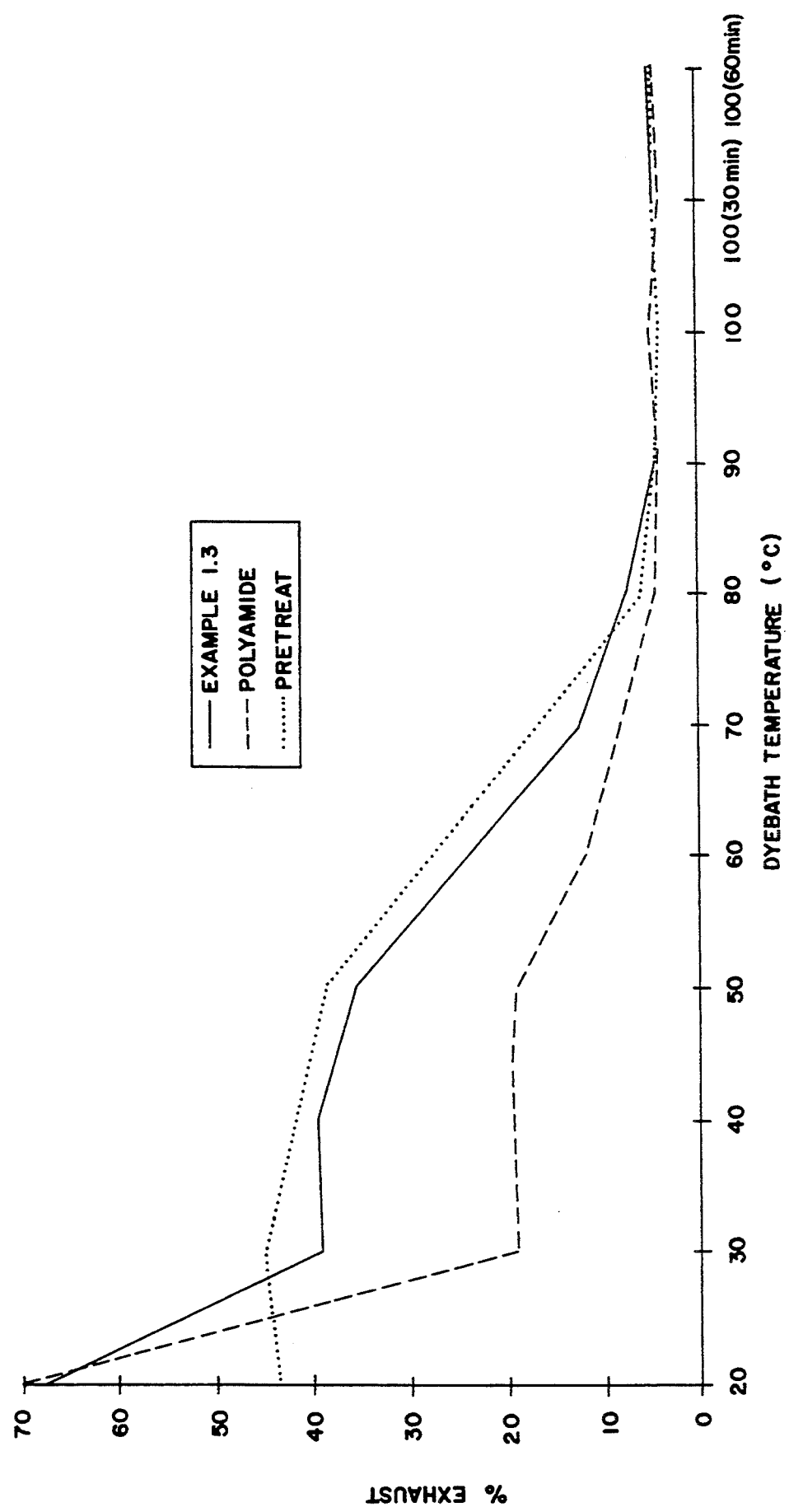
FIGS. 1 and 2 depict the degree of strike of the dyestuff onto the fiber as a function of temperature.

The polymers and prepolymers of this invention essentially result from the reaction of one or more polyoxyalkyleneamines, either as a simple mixture or joined by a polyfunctional bridging group in a prior reaction, with an epihalohydrin or other reactive species, such as formaldehyde, so as to generate a grouping on the molecule capable of reacting with protein fibre surfaces. The reactants are used in such proportions that preferably, though not necessarily, all of the amino groups are reacted.

The present invention relates to polymers and prepolymers which may be represented by any one of the following formulae:

i)

$$Z\text{---}\{[A]_m\text{---}N(R_1)_n\}_r \quad (I)$$

which may be expressed more simply as:

$$J[N(R_1)_n]_r \quad (II)$$

or
ii) structure involving crosslinking or bridging of the above groups (I) or (II):

$$[[(R_1)_nN\text{---}A\text{---}]_s Z[[A\text{---}N(R_1)_{n-1}]_{r-3}]_t B \quad (III)$$

which may be expressed more simply as:

$$[[(R_1)_nN\text{---}]_s J[N(R_1)_{n-1}]_{r-3}]_t B \quad (IV)$$

or
iii) a low molecular weight polymeric structure formed from the above groups (I) or (II):

$$\{K\}_x\text{---}\{B\}_y\text{---}K \quad (V)$$

wherein
Z represents a residue of a polyol, preferably a di- or trivalent polyol;
A1 represents a polyalkylene oxide residue, that is a polyether chain produced by polymerisation of, for example, ethylene, propylene or butylene oxides or tetrahydrofuran;
B is the residue created by bi- or polyfunctional reaction between any polyfunctional reactive group and the parent amine of the title compounds (formula (I) where R1 is hydrogen in all cases), or is the residue of a reactive amino-acrylic polymer (e.g. of the type described in EP-A-0129322) or a reactive polyamide polymer (e.g. of the type described in EP-A-0260017A or a Hercosett polymer), and may be taken, for example, to represent
a group $$\text{---}E\text{---}(R_3)_pN\text{---}[D]\text{---}N(R_3)_p\text{---}E\text{---} \quad (VI)$$

a group (VII)

a group resulting from the reaction of a bi- or polyfunctional species capable of reacting with amino groups, for example: epihalohydrins, alkyl di- and polyhalides, di- or polycarboxylic acids or their acyl halides and anhydrides, dicyandiamide, urea and formaldehyde, a group derived from low molecular weight reactive resins such as the Bisphenol A type, or a group derived from reaction of a cationic polymeric reactive species such as $$\text{---}CH_2\text{---}CH\text{---}CH_2\text{---}\overset{R_6}{\underset{R_7}{N^\oplus}}\text{---}\left[Y\text{---}\overset{R_6}{\underset{R_7}{N^\oplus}}\right]_q CH_2\text{---}CH\text{---}CH_2\text{---}$$
$$\phantom{xxxxx}OH \phantom{xxxxxxxxxxxxxxxxxxxxxxxxxxxxx} OH$$

where $R_6$ and $R_7$ are selected from $C_1$–$C_5$ alkyl and $C_2$–$C_5$ hydroxyalkyl radicals, Y is selected from $C_2$–$C_6$alkylene radicals, 2-hydroxy-1,3-propylene radicals, and the radicals:

$$\text{---}CH_2CH_2NHCONHCH_2CH_2\text{---}$$

and $$\text{---}CH_2CH_2CH_2NHCONHCH_2CH_2CH_2\text{---}$$

and q is an integer of from 0 to 20, provided that when q is greater than 2, each of the symbols Y need not necessarily have the same significance;

D represents a straight or branched chain hydrocarbon, polysiloxane or polyalkylene oxide residue, and which may also either bear functional groups or may contain functional groups, such as amino groups, which may in turn either bear one or more groups $R_1$ or, where B is polyfunctional rather than bifunctional, may represent a further functional reaction point of the group B with the rest of the molecular structure;

E represents a group resulting from the reaction of a bi- or polyfunctional species capable of reacting with amino groups, for example: epihalohydrins, alkyl di- and polyhalides, dicarboxylic acids or their acyl halides and anhydrides, dicyandiamide, urea and formaldehyde;

J represents a residue derived from a polyfunctional polyether;

K represents the monofunctional or polyfunctional residue derived from partial reaction of the basic prepolymers in formulae (I) or (II), i.e. it represents the shaded area in formula (III) as follows:

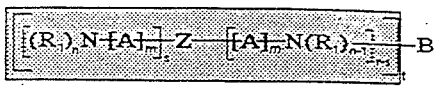

$R_1$ represents a fibre reactive grouping such as the residue derived from monofunctional reaction of an epihalohydrin, an alkyl or alkyl aryl polyhalide or a methylol grouping derived from monofunctional reaction of formaldehyde, or is alkyl, hydroxyalkyl or hydrogen, with the proviso that at least one group $R_1$ per polyoxyalkyleneamine residue, and preferably at least one for each nitrogen, retains residual fibre reactivity;

$R_2$ represents a fibre reactive grouping such as the residue derived from monofunctional reaction of an epihalohydrin, an alkyl or alkyl aryl polyhalide or is a methylol grouping derived from monofunctional reaction of formaldehyde, or alkyl, hydroxyalkyl or hydrogen;

$R_3$ represents hydrogen or $C_1$–$C_4$ alkyl or hydroxyalkyl;

$R_4$ represents halogen or a group

or one of alkylamino, hydroxyalkylamino, alkoxy, alkylarylamino or a group

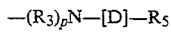

or a functional reaction point of the group B with the rest of the molecular structure, where B is polyfunctional rather than bifunctional;

$R_5$ represents hydrogen or a group

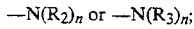

m is between 4 and 50;

n is 2 or 3, with the proviso that, where n is 3, the nitrogen atom involved also bears a formal positive charge;

p is 1 or 2, with the proviso that, where 2, the nitrogen atom involved also bears a formal positive charge;

r equals the functionality of group Z;

t is a number representing the functionality of reaction of the residue B;

s is a number between 1 and r−1;

x is between 2 and 30; and y is from $$\frac{x}{t-1} \text{ to } x,$$

with the general proviso that, in any given instance, the significance of a particular group Z, A, B, R, J or K in any given structure shall not be dictated by the significance of any other such group in the same formula, and further, wherever a formal positive charge is present in the structure, then an appropriate counter anion is taken to be present, for example chloride ion.

The term "fibre reactive grouping" as used herein is to be understood as meaning a group having residual chemical reactivity such that it will be capable of causing a molecule to be bound to the surface of a fibre in such a way as not to be readily removable therefrom.

Examples include the fibre reactive dyes in which a variety of reactive halogen groupings are sited on the molecule and which, during dyeing, react with hydroxy or amino functionalities on the fibre surface to produce a chemical bond. It will be understood that electrical bonding forces, rather than chemical forces, could be involved and that a "reaction" as such need not occur. The terminology further includes species which will be attracted to a fibre surface and bind themselves thereto by means of cross-linking mechanisms.

The term "polyfunctional reactive group" as used herein is to be understood as meaning a group which is capable of reacting with the amino functionality of compounds of formula I or II. The reactivity of group B needs to be complimentary to that of group $R_1$ in those compounds.

It will be understood that the polymers and prepolymers may be derived from mixtures of one or more polyoxyalkyleneamines and that these may be joined by bridging groups. The bridging groups serve to link the polyoxyalkyleneamines and some examples of suitable groups were mentioned above. The bridging groups themselves could, of course, bear reactive species capable of reacting with protein fibres. It will also be appreciated that the bridging group B could be incorporated into the molecular structure, whilst the prepolymer is being applied to the fibre, as a separate reactive cross-linking agent.

The chemistry and reactions of the epihalohydrins, the alkyl polyhalides and formaldehyde, etc. are well known and it is not necessary to describe in detail the conditions required for their reaction with the polyoxyalkyleneamines according to this invention. The proportions used, however, are preferably such as to ensure that substantially all of the amino groups in the polyoxyalkyleneamine residues are reacted. The reaction is best performed at elevated temperature, typically within the range of from 40° to 150° C.

The polymers and prepolymers of this invention are suitable for use in a method for imparting shrink resistance to wool and which comprises treating the wool with an aqueous solution of the polymer to be applied to the wool fibres. The application of the polymer alone can produce an acceptable level of shrink resistance in the wool. It is, however, well known that the treatment of wool fibres with various reagents, such as oxidative agents or reducing agents, can improve the effectiveness of a polymer treatment. The polymer treatment may be carried out prior to, in conjunction with or subsequent to any such further treatment of the wool. Most preferably, the polymer is applied subsequent to an oxidative pretreatment of the wool.

As previously mentioned, oxidative pretreatments are a conventional procedure in the shrink-proofing of wool and a number of suitable treatments are well known. For example, the wool could be treated with permonosulphuric acid. Alternatively, a chlorinating oxidative pretreatment may be employed and this would typically involve the use of chlorine gas. Chlorinating agents such as hypochlorite or sodium dichloroisocyanurate may also be employed, (optionally together with potassium permanganate or permonosulphate), typically at levels of 0.25–2.0% active chlorine by weight on the weight of the dry wool (o.w.w.), most preferably 0.5–1.2%. The optimum level of chlorine employed is generally dependent upon the level of polymer used in the next stage of the process. The pretreatment will, by itself, produce a small degree of shrink-resistance in the wool.

The wool is subjected to antichlorination treatment with sulphite and rinsed and is then ready for the polymer application stage.

The polymer or prepolymer may be applied to the wool in a conventional manner from a bath. The total amount of polymer solids applied to the wool fibre in the method of this invention is generally from 0,005 to 10% by weight, most preferably from 0.05% to 2.0%. The polymer or prepolymer can be used in either a batch or a continuous process for the treatment of wool.

Following the polymer treatment, the wool is dried and may then be further processed in the usual manner.

It has surprisingly been found that treatment of wool with the polymers or prepolymers of this invention results in a good level of shrink resistance. The treated wool also has a soft handle and there will usually be no need to use an additional softening agent. It has been found that the polymers are generally more effective than the polyamide types (e.g. Hercosett polymers) currently in commercial use, and result in an acceptable shrink resist with much lower polymer solids being deposited on the wool. This advantage, coupled with the lower cationicity of the polymers, further results in better dyeing characteristics. Rate of strike is lower and so the risk of unlevel dyeing is greatly reduced. Further, on repeated washing in a mixed wash load, there is less dye pickup from the laundry liquor and thus the garments will appear to soil less readily. In addition, having regard to the concern expressed about the amount of chlorinated materials being released into the environment, the present process has the desirable advantages of using polymers that can be applied to the wool at lower levels and which do not necessarily contain chlorine reactive species.

It is believed that the polymers and prepolymers of this invention could also be used for other applications such as, for example, emulsion breakers, anti-static agents, anti-crease agents and to impart stain resistance.

The polymers, prepolymers and method of this invention will now be illustrated by the following Examples.

Raw Materials Used for Synthetic Work

In the following examples, various amino containing prepolymers have been used. Their structures may be defined by one of the following structures.

$$H_2NCH.CH_2\text{—}(OCH.CH_2)_{\overline{a}}\text{—}(OCH_2.CH_2)_{\overline{b}}\text{—}(OCH_2.CH)_{\overline{c}}\text{—}NH_2 \quad \text{(IX)}$$
$$\begin{array}{c} CH_3 \quad\quad CH_3 \quad\quad\quad\quad\quad CH_3 \end{array}$$

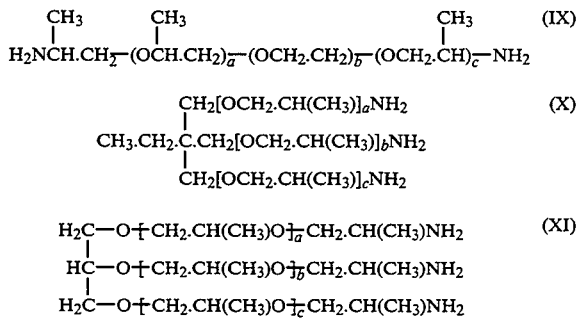

(X)

(XI)

Although in most cases the manufacturer quotes exact structures, additional technical data has been provided in the examples.

In the following examples a distinction is made between the preparations based on the ratio of epichlorohydrin to amino Onitrogen. For example a 1:1 molar ratio uses 1 mole of epichlorohydrin for each nitrogen atom in 1 mole of the amino containing prepolymer.

EXAMPLE 1

(1.1) Preparation of prepolymer (1:1) adduct

A solution was prepared containing 3000 g (approx. 1 mole) of a compound of formula XI (where a+b+c=50, molecular weight approximately 3000, total amine 6.45 Mequivalents/g) in 6726.4 g of a mixture of 70 parts by weight isopropyl alcohol and 30 parts by weight water. To this solution was added 273.6 g (2.96 mole) epichlorohydrin with efficient stirring at room temperature in a reaction flask fitted with a water cooled reflux condenser. The mixture was then heated until the isopropanol began to boil, and then maintained at reflux for approximately 4 hours or until when 5 ml of the reaction mixture was diluted with 30 ml water a clear solution resulted. The flask was then allowed to cool and the reaction mixture tested as in 1.4 below.

(1.2) Preparation of prepolymer (2:1) adduct

The procedure described in 1.1 above was followed with the following changes: 6452.5 g of 70% weight/weight isopropyl alcohol in water were used for the solution and 547.5 g (5.92 mole) of epichlorohydrin added.

(1.3) Preparation of prepolymer (3.1) adduct

The procedure described in 1.1 above was followed except that 6178.9 g of 70% weight/weight isopropyl alcohol in water were used for the solution and 821.1 g (8.88 mole) epichlorohydrin added.

(1.4) Performance Evaluation

The three adducts prepared in 1.1-1.3 above were tested for their ability to stabilise wool against shrinkage by applying them to wool swatches which had been pretreated with an oxidative shrink resist pretreatment as follows.

A quantity of 23.5 micron quality wool top was treated with a mixture of 2% o.w.w. dichloroisocyanuric acid sodium salt and 1% o.w.w. potassium permonosulphate according to the Dylan XC2 process (Precision Processes (Textiles) Ltd) to produce a moderate degree of shrink resistance. This top was then spun to 2×24s worsted count and knitted into swatches with a cover factor of 1.29 DT.

Each swatch was then scoured for 15 min in 1% o.w.w. commercial nonionic detergent (Millscour XBN, Precision Processes (Textiles) and 3% o.w.w. of sodium bicarbonate at 45° C. with a 30:1 liquor ratio, then rinsed once in warm water and once in cold. The swatches were treated as follows.

The wet goods were entered into a fresh bath at a liquor ratio of 30:1. A 1% weight/weight solution of the product from examples 1.1-1.3 above which was to be tested was prepared in cold water. A sufficient quantity of this solution was then drip fed into the treatment bath over 15 minutes, whilst agitating the test swatch, such that an amount of prepolymer solids equivalent to 1% by weight of the dry weight of the swatch was added to the bath. The temperature of the bath was then raised to 40° C. and held at this temperature for approximately 20 minutes, whilst agitating the swatch, until the bath was shown to have exhausted by taking 10. ml of bath liquor and treating this with 2 ml of a 1% solids solution of sodium dodecylbenzene sulphonate in water, the absence of cloudiness or precipitate indicating exhaustion.

The treated swatches were then hydroextracted and tumble dried, then tested in a Wascator FOM7 washing machine according to the Test Method TM31 of the International Wool Secretariat. Shrinkage figures were then calculated, giving the following results:

| Preparation Example | % area shrinkage after 1 × 7A followed by 5 × 5A washes |
|---|---|
| 1.1 | 14.3 |
| 1.2 | 0.8 |
| 1.3 | 2.0 |
| Untreated Swatch (XC2 only) | 53.9 |

EXAMPLE 2

Various adducts of various polyamine prepolymers were prepared according to the general procedure described in 1.1 above with the variations shown overpage in Table I.

EXAMPLE 3

The various adducts from Example 2 were tested for their ability to stabilise wool against shrinkage during washing using the procedure given in Example 1.4, with the following results:

| Preparation from Example | % area felting Shrinkage 5 × 5A | |
|---|---|---|
| | 2 × 5A | 5 × 5A |
| 2.1 | 0.6 | 11.1 |
| 2.2 | −0.4 | −1.3 |
| 2.3 | 2.2 | 7.7 |
| 2.4 | 3.8 | 18.2 |
| 2.5 | −1.1 | −3.1 |
| 2.6 | 0.2 | 7.5 |
| 2.7 | −5.2 | 0.1 |
| 2.8 | 15.6 | — |
| 2.9 | 11.5 | — |
| 2.10 | 10.3 | — |
| 2.11 | 10.3 | — |

Note: negative figures in the above table indicate that the swatch extended rather than shrinking.

Note: negative figures in the above table indicate that the swatch extended rather than shrinking.

TABLE I

| | | | Example 2 | | | | |
|---|---|---|---|---|---|---|---|
| Example No. | Structure formula of amine | Value of a, b, c | Solvent mixture | Weight of Solvent g | Amine Content mEq/g | Weight of amine g | Weight of epichlorohydrin g |
| 2.1 | XI | a + b + c = 85 | 70% isopropanol in water | 13720 | 0.46 | 5000 | 440 |
| 2.2 | XI | a + b + c = 85 | 70% isopropanol in water | 13207 | 0.46 | 5000 | 660 |
| 2.3 | X | a + b + c = 5.3 | water | 2930 | 6.45 | 440 | 584.3 |
| 2.4 | X | a + b + c = 5.3 | water | 3072 | 6.45 | 440 | 876.5 |
| 2.5 | IX | a + c = 33, b = 0 | 50% isopropanol in water | 5743 | 0.96 | 2000 | 461.2 |
| 2.6 | IX | a + c = 33, b = 0 | 50% isopropanol in water | 6088 | 0.96 | 2000 | 609.2 |
| 2.7 | IX | a + c = 68, b = 0 | 75% isopropanol in water | 10618 | 0.45 | 4000 | 550.4 |
| 2.8 | IX | a + c = 2.5, b = 40.5 | water | 5584 | 0.88 | 2000 | 393.2 |
| 2.9 | IX | a + c = 2.5, b = 40.5 | water | 6043 | 0.88 | 2000 | 589.8 |
| 2.10 | IX | a + c = 2.5, b = 86 | water | 10115 | 0.45 | 4000 | 335.2 |
| 2.11 | IX | a + c = 2.5, b = 86 | water | 10507 | 0.45 | 4000 | 503.2 |

EXAMPLE 4

The dyeing properties of the material produced in Example 1.3 were examined by dyeing treated swatches with various dyestuffs. Samples of the dyebath liquor were extracted at various temperatures as the dyeing progressed, and the amount of dye present in the dyebath evaluated spectrophotometrically. All dyeings followed the same temperature pattern. Goods were entered cold in a wet state and the temperature increased to the boil at 1° C. per minute to the boil and held at the boil for 1 hour. The goods were then rinsed and dried before testing for shrinkage and colour fastness. In all cases 2% o.w.w. of dyestuff was used, with 1.5% o.w.w. Albegal B (Ciba Geigy) and 2.0% ammonium acetate, the dyebath being held at pH 5.5.

Dye fastness results were comparable with those obtained from dyeings on a commercially available polyamide type resin (Polymer PKS, Precision Processes (Textiles) Ltd) dyed according to the same procedure.

Figure 2:
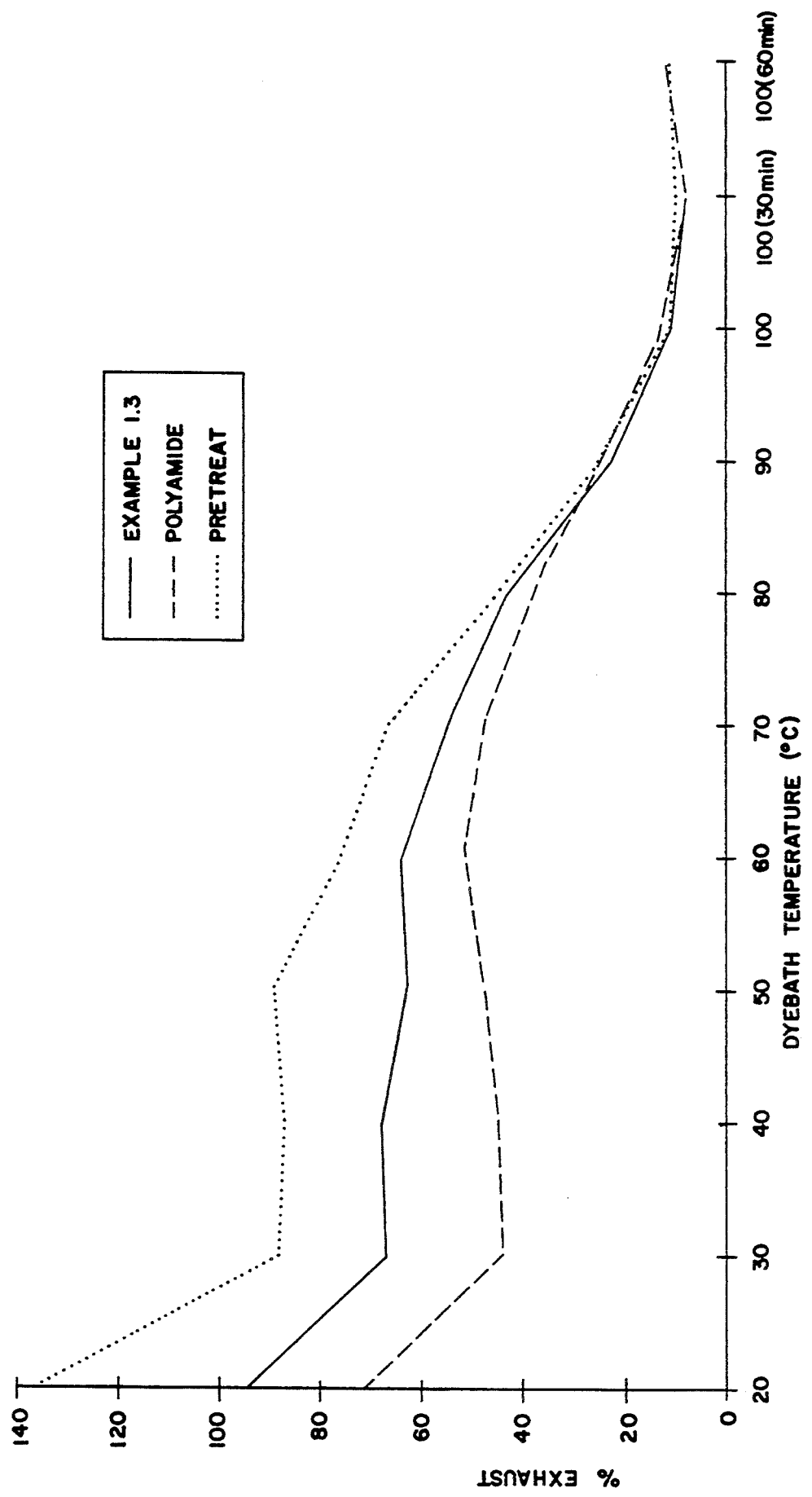

FIGS. 1 and 2:

The attached graphs show the degree of strike of the dyestuff onto the fibre with increasing temperature when compared with swatches treated with commercially available polyamide resin and swatches which had only been given the pretreatment outlined in Example 1.4 above. The rate of strike of the dyestuff is reduced against that of the polyamide based polymer. Shrinkage testing gave the following for 3×5A on the IWS TM31 test:

Acidol Yellow M5GL (FIG. 2) 8.1%
Sandolan Milling Red NFBL (FIG. 1) 13.7%

EXAMPLE 5

The general procedure of example 1, using in all cases a 70% isopropanol in water solvent, was followed to prepare a number of further adducts of polyether amines either having the general structures

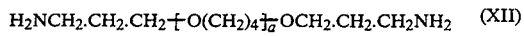  (XII)

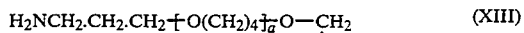
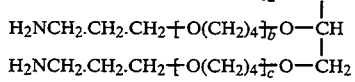  (XIII)

  (XIV)

The details of the preparations are outlined in Table II. The products were tested as described above (Example 1.4) and found useful as shrink resist agents.

EXAMPLE 6

Various bridged adducts were prepared according to the general formula

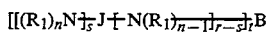

The following general preparative techniques were used:

A: Condensation reactions with acids:

A known quantity of the amino polyether was placed in a flask equipped with stirrer, distillation condenser, nitrogen bleed and dropping funnel. A known quantity of the bridging compound was added, and the mixture heated to 180°–190° C. with stirring until water was evolved. This was allowed to distill off until the theoretical quantity of water was evolved, or no further water could be removed. The flask was allowed to cool, and a suitable quantity of a specified isopropanol (IPA): water mixture was added to dissolve the product. A specified amount of epichlorohydrin was added and allowed to react at reflux temperature until amine titration indicated the reaction to be complete.

B: Reaction with other bifunctional compounds:

A known quantity of aminopolyether was placed in a flask with a specified quantity of isopropanol (IPA): water mixture. A specified quantity of bridging compound was added and the mixture heated at reflux with stirring for 3 hours. When amine titration indicated the reaction to be complete, a specified quantity of epichlorohydrin was added to the mixture and this was further heated for 4 hours or until an amine titcation indicated the reaction to be complete.

Details of the various preparations are given in Table III. The products were found to be useful as shrink resist agents.

Notes to Table III

Note 1 The compound described in example 2.1 of British Patent 1,213,745, as a 50% solution in water.

Note 2 The compound described in example 2.2. of British Patent 1,213,745, as a 50% solution in water.

EXAMPLE 7

To illustrate the in-situ crosslinking effect of reactive polymers, the following polymers were prepared:

7.1) A reactive polyamide polymer prepared according to the procedure described in Example 3 of European Patent Application No. 0260017.

7.2) A reactive water soluble polyacrylate polymer was prepared as follows: into a suitable resin flask equipped with stirrer and reflux condenser were loaded 164 g of isopropanol. The flask was heated to reflux for 1 hour to degas the solvent, then a mixture of 71.5 g methyl methacrylate, 35.8 g of dimethylaminoethyl methacrylate and 0.965 g of azobisisobutyronitrile was dripped into the boiling solvent over 1 hour. The mixture was refluxed for 6 hours. The flask was cooled to 25° C. and 64.5 g of 3.53M hydrochloric acid and 97.4 g of water added. Then 23.6 g of epichlorohydrin was added and the mixture stirred for 24 hours at 25° C.

7.3) The preparation described in 7.2 was repeated using 2.4129 of azobisisobutyronitrile. Before adding epichlorohydrin, 26.9 g of an alpha, omega-glycidyl organofunctional polydimethyl siloxane (Tego OF3010, Goldschindr) followed by 21.24 g of epichloropydrin, and the reaction completed as before.

7.4) The preparation described in 7.3 was repeated except that 14.59 g of a polyether diepoxy resin of molecular weight 640 (DER 732, Dow Chemicals) was added in place of the organofunctional polydimethylsiloxane.

The polymers were then applied to wool as follows:

7.5) The procedure described in 1.4 above was followed except that varying quantities of selected products from the Examples 7.1–7.4 above were applied together with a polymer selected from Examples 1.1–1.3 5 or 6.

7.6) The procedure of 7.5 was repeated using untreated swatches knitted from 23.5 micron quality top spun to 2×21s worsted count. The swatches were then scoured as described in 1.4 and treated with 6% on weight of wool of commercial potassium permonosulphate (Dylanize Salt, PPT), at pH 4.0 which was then neutralised with 5% o.w.w. sodium sulphite. Thereupon the procedure from line 28 in Example 1.4 was followed.

Table IV shows the quantities and identity of the used and the results obtained.

EXAMPLE 8

A specified quantity of aminopolyether was weighed into a flask equipped with stirrer, reflux condenser and dropping funnel 200 ml of a isopropanol: water mixture was added to dissolve the resin and a specified quantity of formaldehyde solution (37% w/w in water) was added. The mixture was heated at reflux for 4 hours.

Table V gives details of the preparation of such methylol-terminated resins. The products were useful as shrink resist agents when tested as described in Example 1.4.

EXAMPLE 9

Into a suitable resin flask equipped with a stirrer was placed 50 g of water, 300 g of methylethyl ketone and 187.5 g of cyanuric chloride. The contents of the flask were maintained at 0° C. whilst 4200 g of a diamino polyether of structure XII (where a=26) was slowly dripped in at such a rate that the temperature did not exceed 2° C. The flask was stirred at below 2° C. for two hours, then slowly allowed to warm to room temperature, then heated slowly to 40° C. until the titrated amine value remained constant. To this mixture was slowly added 185 g of epichlorohydrin, then the flask fitted with a reflux condenser and the contents raised to reflux temperature until the titrated amine value remained constant. Evaluated as above, the product was found useful as a shrink resist agent.

TABLE II

| Example | Structure formula of amine | Values of a, b, c | Weight of solvent g | Weight of amine g | Weight of epichlorohydrin g |
|---|---|---|---|---|---|
| 5.1 | XIV | a = 26 | 277 | 100 | 18.76 |
| 5.2 | XII | a = 28 | 2418 | 881 | 155.3 |
| 5.3 | XIII | a + b + c = 18 | 320 | 100 | 36.7 |

TABLE III

| Example | Bridging compound | Preparation procedure | Structure formula of amine | Value of a,b,c | Solvent Mixture | Weight of solvent g | Weight of amine g | Weight of Bridging compound g | Weight of epichlorohydrin g |
|---|---|---|---|---|---|---|---|---|---|
| 6.1 |  $H_2C\underset{O}{\diagdown}CH[OCH_2CH_2]_nO-CH-CH_2$ <br> n = 13.2 | B | XI | a + b + c ~5.3 | 70 IPA 30 water | 200 | 40 | 14.4 | 16.6 |
| 6.2 | as 6.1 n = 13.2 | B | XI | a + b + c ~5.3 | 70 IPA 30 water | 200 | 40 | 21.6 | 12.5 |
| 6.3 | as 6.1 n = 13.2 | B | XII | a = ~27 | 70 IPA 30 water | 200 | 40 | 2.11 | 2.41 |
| 6.4 | as 6.1 n = 13.2 | B | XII | a = ~27 | 70 IPA 30 water | 200 | 40 | 1.60 | 2.77 |
| 6.5 |  $CH_2\underset{O}{\diagdown}CHCH_2O(CH_2)_3-[Si(CH_3)_2-O]-Si(CH_3)_3-OCH_2-CH\underset{O}{\diagdown}CH_2$ <br> n = 12 | B | XII | a = ~7 | 50 IPA 50 water | 200 | 80 | 63.13 | 9.9 |
| 6.6 |  HOOC—⟨benzene⟩—COOH | A | XII | a = 9 | 70 IPA 30 water | 200 | 80 | 2.92 | 16.5 |
| 6.7 | as 6.6 | A | XII | a = ~27 | 70 IPA 30 water | 200 | 80 | 3.32 | 3.7 |
| 6.8 | 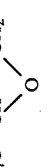 HOOC—⟨biphenyl⟩—COOH | A | XII | a = ~9 | 50 IPA 50 water | 200 | 80 | 6.47 | 12.97 |
| 6.9 | as 6.8 | A | XII | a = ~9 | 50 IPA 50 water | 200 | 80 | 12.94 | 9.99 |
| 6.10 | HOOC[CH$_2$]$_6$COOH | A | XII | a = ~7 | 50 IPA 50 water | 200 | 305.6 | 29.2 | 37.0 |
| 6.11 | as 6.10 | A | IX | a + c = 2.5 b = 8.5 | 50 IPA 50 water | 200 | 320 | 36.52 | 46.3 |
| 6.12 | Note 1 | B | XI | a + b + c = 85 | IPA | 200 | 100 | 22.1 | 12.3 |
| 6.13 | Note 2 | B | IX | a + c = 2.5 b = 40.5 | water | 200 | 100 | 20.1 | 12.3 |
| 6.14 | 1,3-dibromopropane | B | XII | a = ~7 | 50 IPA 50 water | 200 | 40 | 5.05 | 4.9 |
| 6.15 | 1,6-dichlorohexane | B | XII | a = ~7 | 50 IPA 50 water | 200 | 40 | 3.88 | 4.9 |
| 6.16 | 1,10-dibromodecane | B | XII | a = ~7 | 50 IPA 50 water | 200 | 40 | 7.5 | 4.9 |
| 6.17 | 1,4-di(chloromethyl)benzene | B | XII | a = ~7 | 50 IPA 50 water | 200 | 40 | 4.38 | 4.9 |

TABLE IV

| Example | Prepolymer from Example | % solids applied o.w.w. | Reactive polymer of example | % solids applied o.w.w. | Shrinkage test results 2 × 5A | 3 × 5A | 5 × 5A | Application procedure |
|---|---|---|---|---|---|---|---|---|
| 7.7 | 1.3 | 0.75 | 7.1 | 0.25 | −2.2 | — | −1.0 | 7.5 |
| 7.8 | 5.2 | 0.25 | 7.2 | 0.25 | — | −0.5 | 2.6 | 7.5 |
| 7.9 | 5.2 | 0.375 | 7.2 | 0.125 | — | 2.6 | 4.3 | 7.5 |
| 8.0 | 5.2 | 1.36 | 7.1 | 0.14 | 6.2 | 13.1 | — | 7.6 |
| 8.1 | 5.2 | 1.46 | 7.1 | 0.04 | 6.5 | 7.3 | — | 7.6 |
| 8.2 | 5.2 | 1.36 | 7.3 | 0.14 | 4.2 | 8.4 | — | 7.6 |
| 8.3 | 5.2 | 1.36 | 7.4 | 0.14 | 3.1 | 8.8 | — | 7.6 |

TABLE V

| Example | Structure formula of amine | values of a, b, c | weight of resin g | weight of CH₂O* g | solvent mix IPA:water |
|---|---|---|---|---|---|
| 8.1 | XI | a + b + c = 50 | 100 | 15.99 | 70:30 |
| 8.2 | IX | a + c = 2.5 b = 15.5 | 40 | 2.6 | 50:50 |
| 8.3 | IX | a + c = 2.5 b = 15.5 | 40 | 5.2 | 50:50 |
| 8.4 | IX | a + c = 33 b = 0 | 40 | 1.2 | 50:50 |
| 8.5 | IX | a + c = 33 b = 0 | 40 | 2.3 | 50:50 |
| 8.6 | XII | a = 27 | 80 | 2.28 | 70:30 |
| 8.7 | XII | a = 27 | 80 | 4.56 | 70:30 |

*expressed as CH₂O not formalin solution

We claim:

1. A polymer or prepolymer having the following structural formula:

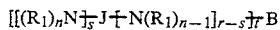

where N is nitrogen;
J represents a grouping:

$$-A-Z-A- \quad \text{or} \quad +A\overline{\tau}Z^1$$

where Z is a $C_2-C_6$ alkylene group; and
$Z^1$ represents:

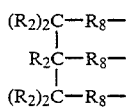

where each $R_2$ is the same or different and is selected from
hydrogen,
or a $C_1-C_6$ alkyl group,
and each $R_8$ is the same or different and is selected from:
a direct bond,
or a $C_1-C_6$ alkylene group;
where A represents:

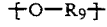

and is always linked to Z by the oxygen atom (O); where $R_9$ represents a $C_2-C_6$ alkylene group, with the proviso that each individual group $R_9$ in any structure is the same or different from any other group $R_9$ in that structure;
B is a bi- or polyfunctional bridging or connecting group;
$R_1$ represents a residue derived from monofunctional reaction of an epihalohydrin, an alkyl or alkyl aryl polyhalide, or is alkyl, monohydroxyalkyl or hydrogen, with the proviso that each individual group $R_1$ in any structure may be the same or different from any other group $R_1$ in that structure;
n is 2 or 3, with the proviso that, where n is 3, the nitrogen atom involved also bears a formal positive charge;
r is either 2 or 3;
t is a number representing the functionality of the residue B;
s=1 when r=2, and s=2 when r=3;
with the proviso that wherever a formal positive charge is present in the structure, then a counteranion is present.

2. The polymer or prepolymer as claimed in claim 1, wherein B is the group:

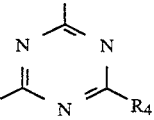

where $R_4$ represents halogen or a group

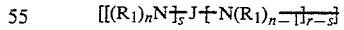

or one of alkylamino, hydroxyalkylamino, alkoxy, alkylarylamino or a group $-(R_3)_pN-[D]-R_5$;
$R_5$ represents hydrogen or a group $-N(R_{21l})_n$ or $-N(R_3)_n$; is alkyl, mono-hydroxyalkyl or hydrogen;
and J, $R_1$, $R_3$, n, p, 4 and s are as defined above.

3. The polymer according to claim 1 having the formula $H_2N.CH_2.CH_2.CH_2[O(CH_2)_4]OCH_2.CH_2.CH_2NH_2$, where a=28.

4. The polymer or prepolymer as claimed in claim 1, wherein B is a group derived from reaction of a cationic polymeric reactive species of the formula:

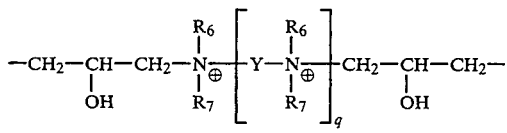

where $R_6$ and $R_7$ are selected from $C_1$-$C_5$ alkyl and $C_2$-$C_5$ hydroxyalkyl radicals, Y is selected from $C_2$-$C_6$ alkylene radicals, 2-hydroxy-1,3-propylene radicals, and the radicals:

—CH₂CH₂NHCONHCH₂CH₂— and

—CH₂CH₂CH₂NHCONHCH₂CH₂CH₂— and q is an integer of from 0 to 20, provided that when q is greater than 2, each of the symbols Y is the same or different.

5. The polymer or prepolymer as claimed in claim 1, wherein B is the group:

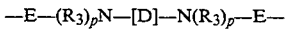

where E represents a group resulting from the reaction of a bi- or polyfunctional species capable of reacting with amino groups;

D represents a straight or branched chain hydrocarbon, polysiloxane or polyalkylene oxide residue, and which optionally bear functional groups or contain functional groups;

$R_3$ represents hydrogen or $C_1$-$C_4$ alkyl or hydroxyalkyl;

and p is 1 or 2, with the proviso that, where p is 2, the nitrogen atom involved also bears a formal positive charge.

6. The polymer or prepolymer as claimed in claim 5 wherein said functional groups are amino groups which are optionally substituted with one or more groups $R_1$.

* * * * *